United States Patent
Yi et al.

(10) Patent No.: US 8,483,062 B2
(45) Date of Patent: Jul. 9, 2013

(54) APPARATUS AND METHOD FOR FLOW CONTROL IN WIRELESS COMMUNICATION SYSTEM

(75) Inventors: Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 329 days.

(21) Appl. No.: 12/813,940

(22) Filed: Jun. 11, 2010

(65) Prior Publication Data

US 2010/0315948 A1 Dec. 16, 2010

Related U.S. Application Data

(60) Provisional application No. 61/186,389, filed on Jun. 12, 2009.

(30) Foreign Application Priority Data

Jun. 9, 2010 (KR) .......................... 10-2010-0054174

(51) Int. Cl.
*H04J 3/14* (2006.01)
*H04J 3/08* (2006.01)
*H04W 4/00* (2009.01)

(52) U.S. Cl.
USPC ............................ 370/235; 370/315; 370/328

(58) Field of Classification Search
None
See application file for complete search history.

(56) References Cited

U.S. PATENT DOCUMENTS

| | | | |
|---|---|---|---|
| 2008/0049618 A1 | 2/2008 | Ishii et al. | |
| 2008/0108355 A1 | 5/2008 | Oleszcsuk | |
| 2009/0003259 A1 | 1/2009 | Sundaresan et al. | |
| 2009/0010157 A1* | 1/2009 | Holmes et al. | 370/230.1 |
| 2010/0034148 A1* | 2/2010 | Zhang et al. | 370/328 |
| 2011/0063977 A1* | 3/2011 | Halfmann et al. | 370/235 |
| 2012/0057485 A1* | 3/2012 | Weigand | 370/252 |

FOREIGN PATENT DOCUMENTS

EP 2066084 A1 6/2009

* cited by examiner

*Primary Examiner* — Marcus R Smith
(74) *Attorney, Agent, or Firm* — McKenna Long & Aldridge LLP

(57) ABSTRACT

A method and apparatus for flow control in a wireless communication system is provided. The relay node receives from a base station flow control information for a Un interface between the relay node and the base station and determines whether to request to suspend transmission based on the flow control information. The relay node transmits a transmission suspend command to the base station when it is determined to request the transmission suspension.

5 Claims, 11 Drawing Sheets

APPARATUS AND METHOD FOR FLOW CONTROL IN WIRELESS COMMUNICATION SYSTEM

CROSS-REFERENCE TO RELATED APPLICATIONS

This application claims the benefit of priority of U.S. Provisional application 61/186,389 filed on Jun. 12, 2009, and Korean Patent Application No. 10-2010-0054174 filed on Jun. 9, 2010, all of which are incorporated by reference in their entirety herein.

BACKGROUND OF THE INVENTION

1. Field of the Invention

The present invention relates to wireless communications, and more particularly, to a method and apparatus for flow control of a relay in a wireless communication system.

2. Related Art $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

An LTE-A system employs new techniques such as carrier aggregation and a relay. The carrier aggregation is used to flexibly extend an available bandwidth. The relay is used to increase a cell coverage and support group mobility and to enable user-centered network deployment.

The relay provides two types of radio interfaces. One is a Uu interface between a relay and a user equipment, and the other is a Un interface between the relay and a base station. A radio bearer is set up in each radio interface. In order for the user equipment to receive a service from the base station via the relay, two radio bearers need to be set up.

In a legacy system not having a relay, only one Uu interface exists as a radio interface, and flow control is not much necessary since a base station (BS) knows all situations.

However, as the relay is employed, it is difficult for the BS to recognize up to a congestion situation, and thus flow control is required.

SUMMARY OF THE INVENTION

The present invention provides a method and apparatus for flow control of a relay in a wireless communication system.

In an aspect, a method for flow control of a relay node in a wireless communication system is provided. The method includes receiving, by the relay node from a base station, flow control information for a Un interface between the relay node and the base station, determining whether to request to suspend transmission based on the flow control information, and transmitting a transmission suspend command to the base station when it is determined to request the transmission suspension.

The flow control information may include a suspend threshold, and if a data amount of a reception buffer is greater than the suspend threshold, it may be determined to request the transmission suspension.

The method may further include starting a suspend timer as the transmission suspend command is transmitted, and at the expiry of the suspend timer, transmitting the transmission suspend command to the base station.

The method may further include determining whether to request to resume transmission after transmitting the transmission suspend command, and transmitting a transmission resume command to the base station when it is determined to request the transmission resumption.

The flow control information may include a resume threshold, and if the data amount of the reception buffer is less than the resume threshold, it may be determined to request the transmission resumption.

The method may further include starting a resume timer as the transmission suspend command is transmitted, and at the expiry of the resume timer, transmitting the transmission resume command to the base station.

The flow control command may be determined for each radio bearer (RB) configured between the base station and the relay node.

The flow control command may be determined for entire RB configured between the base station and the relay node.

In another aspect, a relay node in a wireless communication system is provided. The relay node includes a buffer configured to store reception data received from a base station, and a flow controller configured to determine whether to request suspend transmission based on flow control information for a Un interface between the relay node and the base station, and if it is determined to request the transmission suspension, transmit a transmission suspend command to the base station.

In another aspect, a method for flow control of a relay node in a wireless communication system is provided. The method includes transmitting, by the relay node to a base station, a flow control command for flow control on a Un interface between the relay node and the base station, and receiving, by the relay node from a base station, scheduled data on the Un interface according to the flow control based on the flow control command.

On a radio interface, a receiver may control a data transmission amount of a transmitter according to a reception buffer status, thereby preventing data from being discarded due to an overflow of a reception buffer. When a relay is employed, it can be useful to avoid a buffer overflow in a situation where a base station cannot know a congestion at the radio interface between a user equipment and the relay.

DESCRIPTION OF EXEMPLARY EMBODIMENTS

Figure 1:
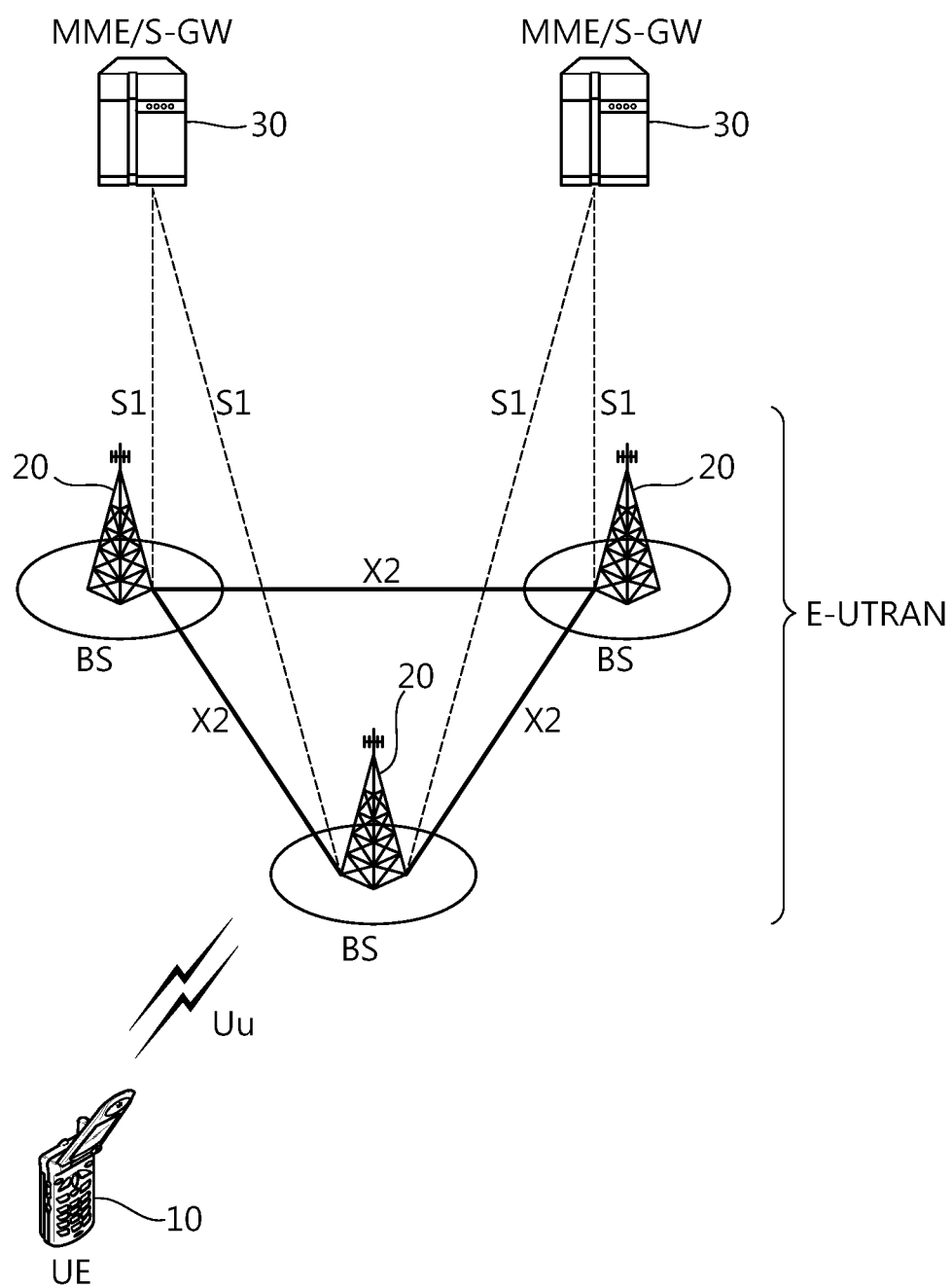
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is referred to as a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
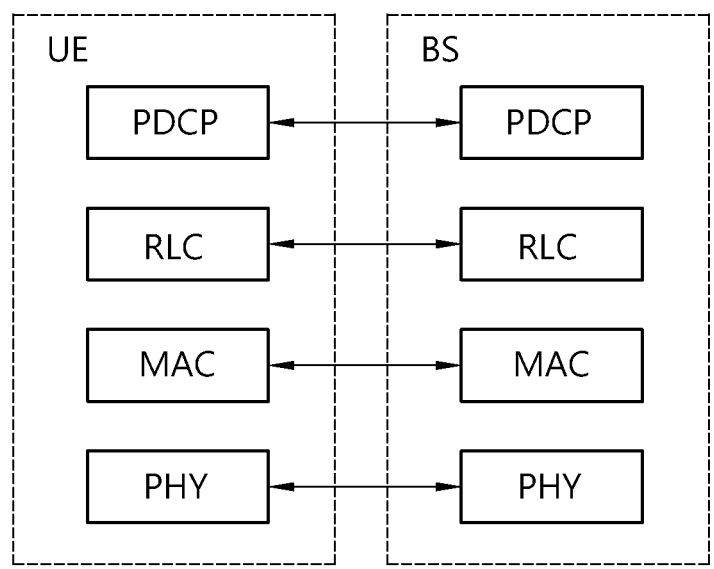
FIG. 2 is a diagram showing a radio protocol architecture for a user plane.
Figure 3:
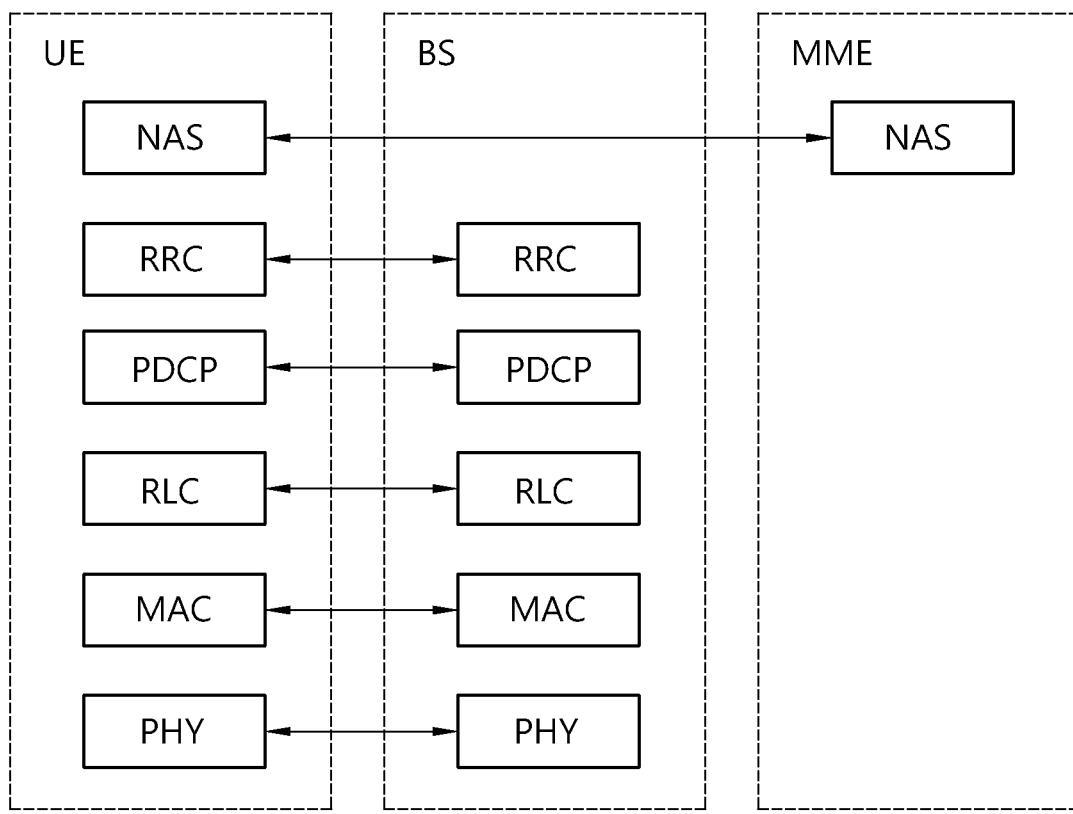
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A function of a packet data convergence protocol (PDCP) layer in the user plane includes user data delivery, header compression, and ciphering. A function of a PDCP layer in the control plane includes control-plane data delivery and ciphering/integrity protection.

A radio resource control (RRC) layer is defined only in the control plane. The RRC layer serves to control the logical channel, the transport channel, and the physical channel in association with configuration, reconfiguration and release of RBs.

An RB is a logical path provided by the first layer (i.e., PHY layer) and the second layer (i.e., MAC layer, RLC layer, and PDCP layer) for data delivery between the UE and the network. An RB setup procedure is a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

When an RRC connection exists between an RRC layer of the UE and an RRC layer of the network, the UE is in an RRC connected state, and otherwise the UE is in an RRC idle state.

Figure 4:
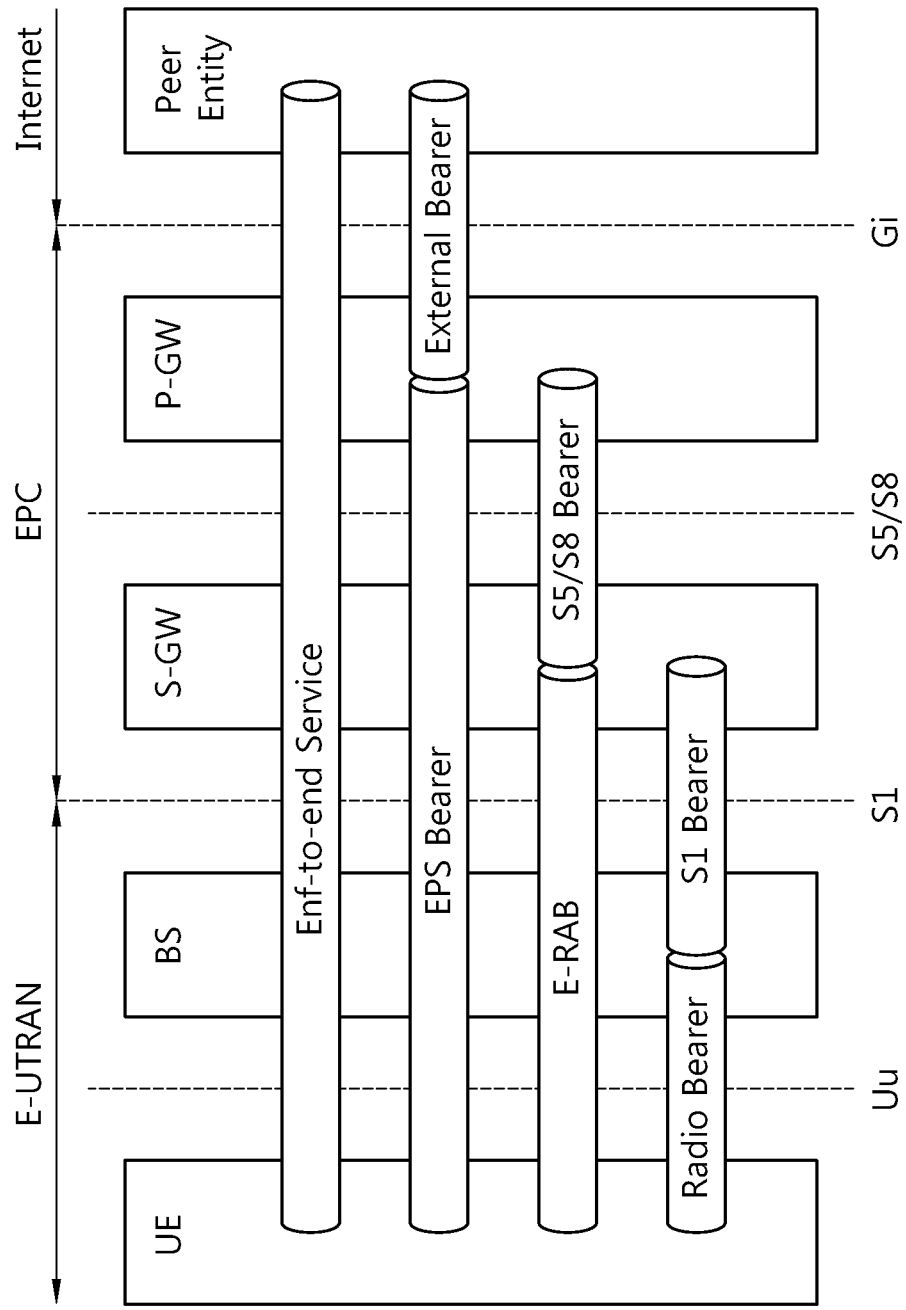
FIG. 4 shows a structure of a bearer service in $3^{rd}$ generation partnership project (3GPP) long term evolution (LTE).

FIG. 4 shows a structure of a bearer service in 3GPP LTE. An RB is a bearer provided through a Uu interface to support a service of a user. By defining a bearer for each interface, the 3GPP LTE ensures independency between interfaces.

Bearers provided by a 3GPP LTE system are collectively referred to as an evolved packet system (EPS) bearer. For each interface, the EPS bearer is classified into a radio bearer (RB), an S1 bearer, and so on.

A packet gateway (P-GW) is a network node for connecting an LTE network and another network. The EPS bearer is defined between a UE and the P-GW. The EPS bearer is further divided between nodes, and thus an RB is defined between the UE and a BS, an S1 bearer is defined between the BS and an S-GW, and an S5/S8 bearer is defined between the P-GW and the S-GW in an EPC. Each bearer is defined by using a quality of service (QoS). The QoS is defined by using a data rate, an error rate, a delay, etc.

Therefore, a QoS to be provided generally in the LTE system is first defined by using the EPS bearer, and thereafter a QoS of each interface is defined. Each interface sets up a bearer according to a QoS to be provided by itself.

Regarding bearers of respective interfaces, QoSs of entire EPS bearers are provided by being divided for each interface. Therefore, the EPS bearer, the RB, the S1 bearer, and so on have a one-to-one relation.

A long-term evolution-advanced (LTE-A) system is an LTE system evolved to conform to an IMT-advanced requirement which is a $4^{th}$ generation mobile communication requirement recommended by international telecommunication union-radio communication sector (ITU-R). An LTE-A system standard has actively been developed in recent years in 3GPP which developed the LTE system standard.

The LTE-A system employs new techniques such as carrier aggregation and a relay. The carrier aggregation is used to flexibly extend an available bandwidth. The relay is used to increase a cell coverage and support group mobility and to enable user-centered network deployment.

Figure 5:
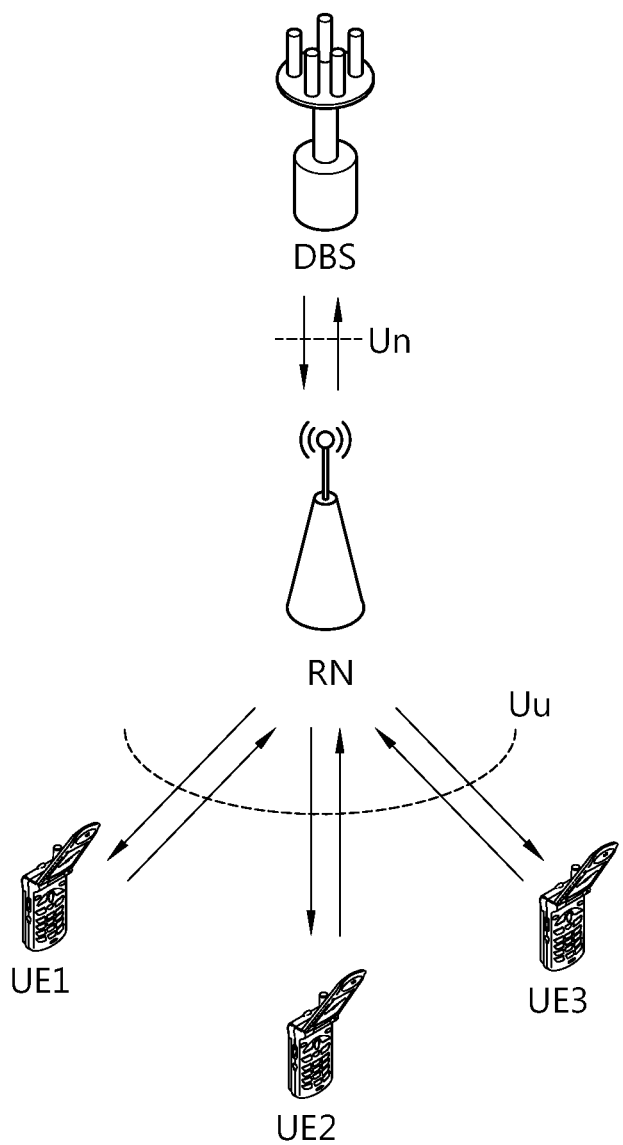
FIG. 5 shows a network system supporting a relay.

FIG. 5 shows a network system supporting a relay. The relay serves to relay data between a UE and a BS. A network node for performing a relay function is referred to as a relay node (RN). A BS for managing one or more RNs is referred to as a donor BS (DBS).

A radio interface between the UE and the RN is referred to as a Uu interface. A radio interface between the RN and the DBS is referred to as a Un interface. A link between the UE and the RN is referred to as an access link. A link between the RN and the DBS is referred to as a backhaul link.

The RN manages the UE on behalf of the DBS. The UE can receive a service transparently from the DBS via the RN. This implies that it is not necessary to know whether the UE receives the service from the DBS via the RN or whether the UE receives the service directly from the DBS. Therefore, the Uu interface between the UE and the RN can use a Uu interface protocol used by the 3GPP LTE almost without changes.

From the perspective of the DBS, the RN can receive a service as a UE and also can receive the service as a BS of the UE. For example, when the RN initially accesses the DBS, the DBS does not know whether the RN attempts to access. Therefore, the RN can attempt to access the DBS by performing a typical random access process similarly to other UEs. Once the RN has accessed the DBS, the RN operates as if it is a BS for managing a UE connected to the RN.

Accordingly, a Un interface protocol is necessarily defined in a format in which a function of a network protocol is added together with a function of the Uu interface protocol. Regarding the Un interface protocol, there is an ongoing discussion on which function is to be added or changed in each protocol layer in current 3GPP on the basis of the Uu interface protocol such as MAC/RLC/PDCP/RRC layers.

Figure 6:
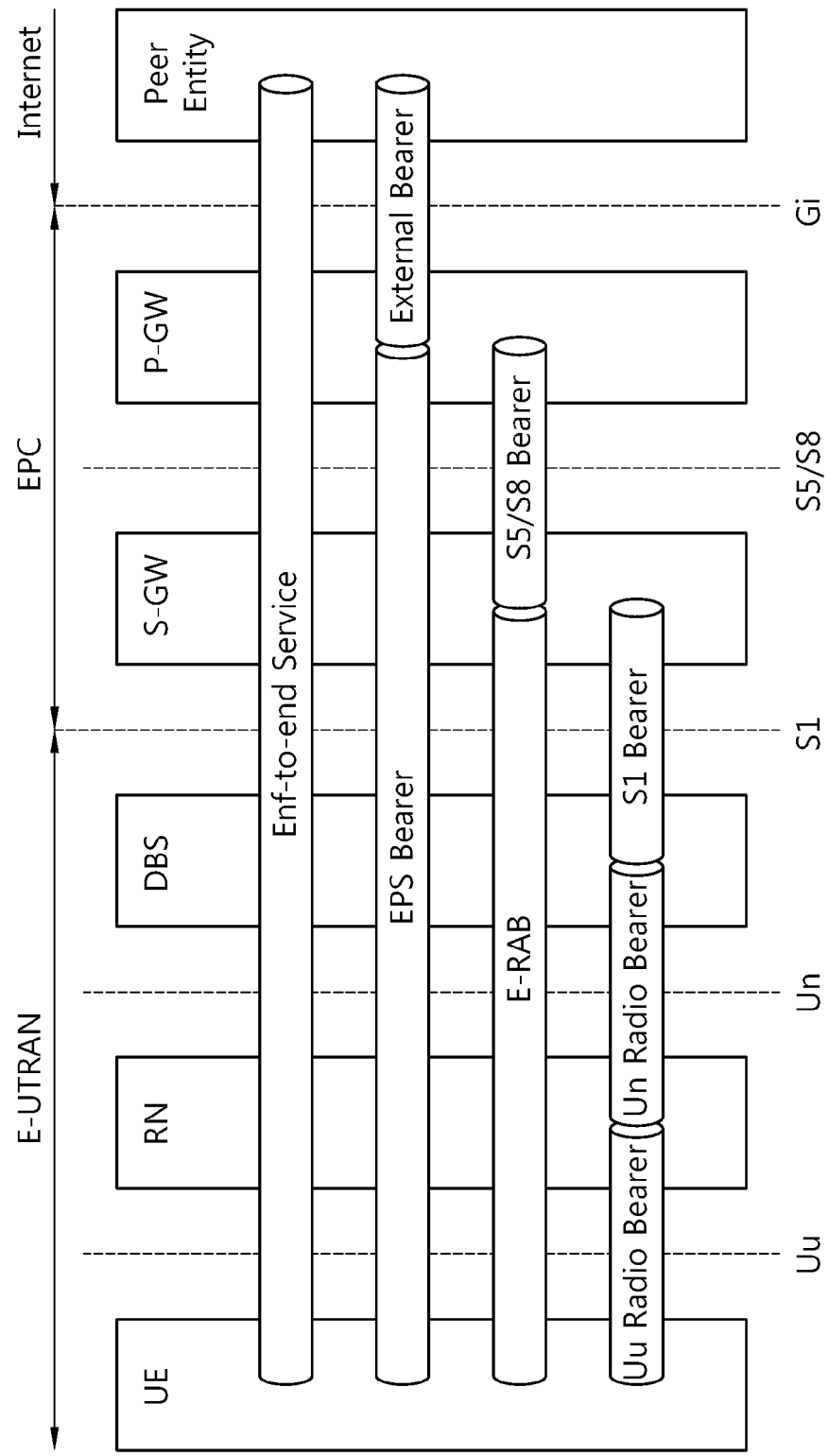
FIG. 6 shows an exemplary structure of a bearer service in a network system employing a relay.

FIG. 6 shows an exemplary structure of a bearer service in a network system employing a relay.

An EPS bearer is defined between a UE and a P-GW. More specifically, a Uu radio bearer (UuRB) is defined between the UE and an RN, a Un RB (UnRB) is defined between the RN and a DBS, and an S1 bearer is defined between the DBS and an S-GW. The UuRB can be defined to be identical to the existing RB between the UE and a BS.

Hereinafter, the UuRB denotes an RB which is set up in a Uu interface, and the UnRB denotes an RB which is set up in a Un interface.

Figure 7:
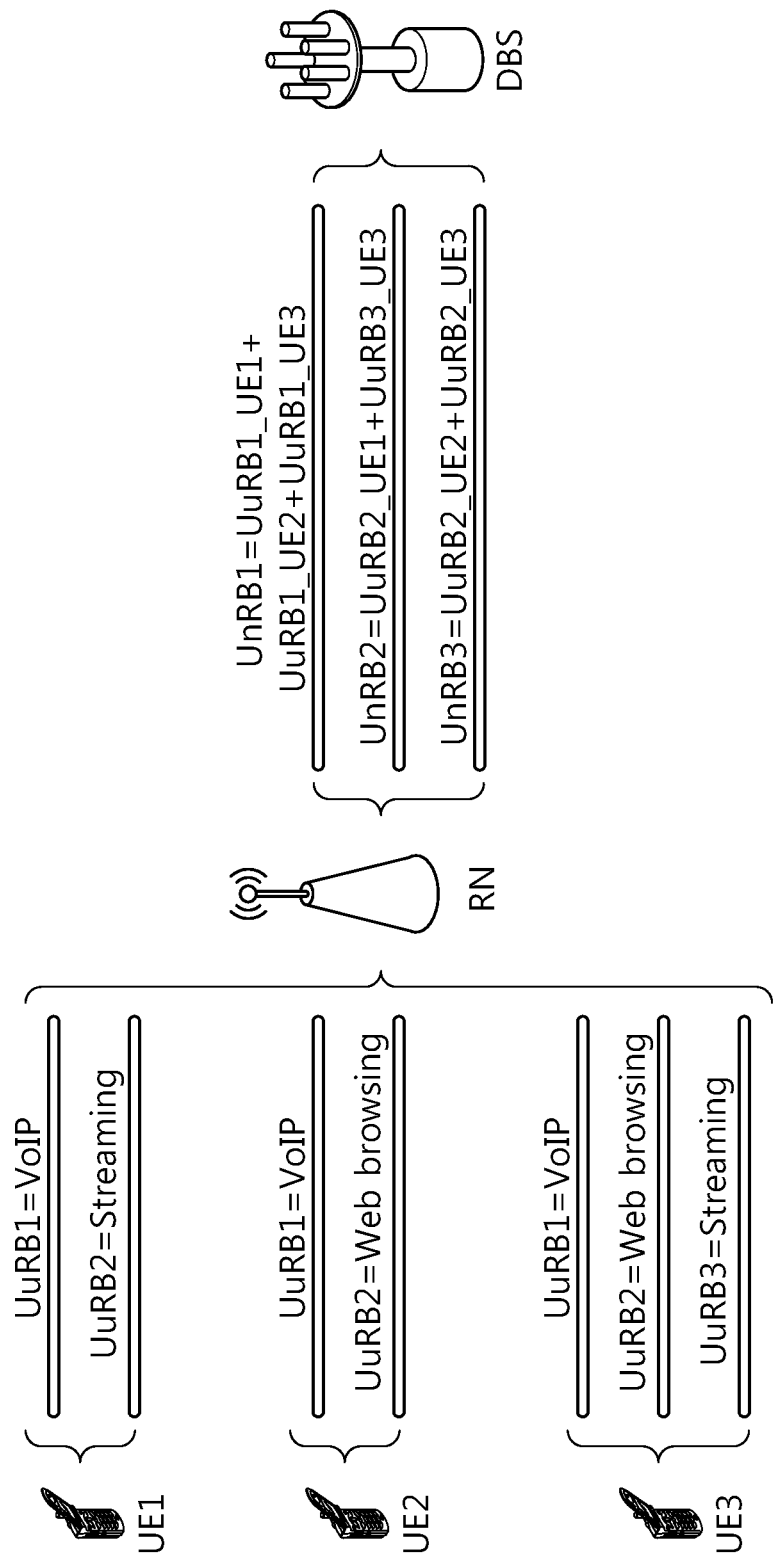
FIG. 7 shows an example of UuRB-UnRB mapping.

FIG. 7 shows an example of UuRB-UnRB mapping. In this case, a UnRB between an RN and a DBS is determined according to a QoS. A method of mapping UuRBs having identical or similar QoSs to a UnRB irrespective of a UE is referred to as per-QoS bearer mapping.

Since one UnRB ensures one QoS, a UuRB which is set up between the UE and the RN is mapped to a specific UnRB according to a QoS property irrespective of the UE. Among a plurality of UuRBs for a plurality of UEs, UuRBs having the same ensured QoS are mapped to the same UnRB, and UuRBs having different ensured QoSs are mapped to different UnRBs.

Several UuRBs are multiplexed and are transmitted using one UnRB, and thus a data packet transmitted through the UnRB may include a UE ID for identifying the UE and an RB ID for identifying an RB for one UE.

In the example of FIG. 7, a UuRB1_UE1, a UuRB1_UE2, and a UuRB1_UE3, each of which has a QoS for the same VoIP, are mapped to a UnRB1. A UuRB2_UE1 and a UuRB3_UE3, each of which has a QoS for streaming, are mapped to a UnRB2. A UuRB2_UE2 and a UuRB2_UE3, each of which has a QoS for web browsing, are mapped to a UnRB3. Each UnRB has a unique QoS supported by itself, and thus the number of UnRBs which are set up between the RN and the DBS is equal to the number of QoSs supported between the RN and the DBS.

When the number of UuRBs having the same QoS is great, radio resources may be insufficient to transmit data packets multiplexed using one UnRB. In this case, even UuRBs having the same QoS may be mapped to different UnRBs. On the other hand, if the radio resources are sufficient for one UnRB, one UnRB may support several similar QoSs. That is, UuRBs having similar QoSs are mapped to one UnRB.

Hereinafter, an RB may be a unidirectional RB supporting only an uplink or a downlink or may be a bidirectional RB supporting both the uplink and the downlink.

In a legacy system not having an RN, only one Uu interface exists as a radio interface, and flow control is not much necessary since a BS know all situations. A UE reports a UE buffer size when accessing the BS. The BS can know an uplink buffer status by using a buffer status report of the UE. The BS can know a downlink buffer status by using an RLC status report of the UE. An uplink data transmission amount or a downlink data transmission amount can be scheduled by the BS by using an uplink grant or a downlink grant, and thus a congestion situation can be resolved under the control of the BS.

As the RN is employed, two interfaces, i.e., a Uu interface and a Un interface, are present as a radio interface. The BS cannot know a congestion situation between the UE and the RN.

Figure 8:
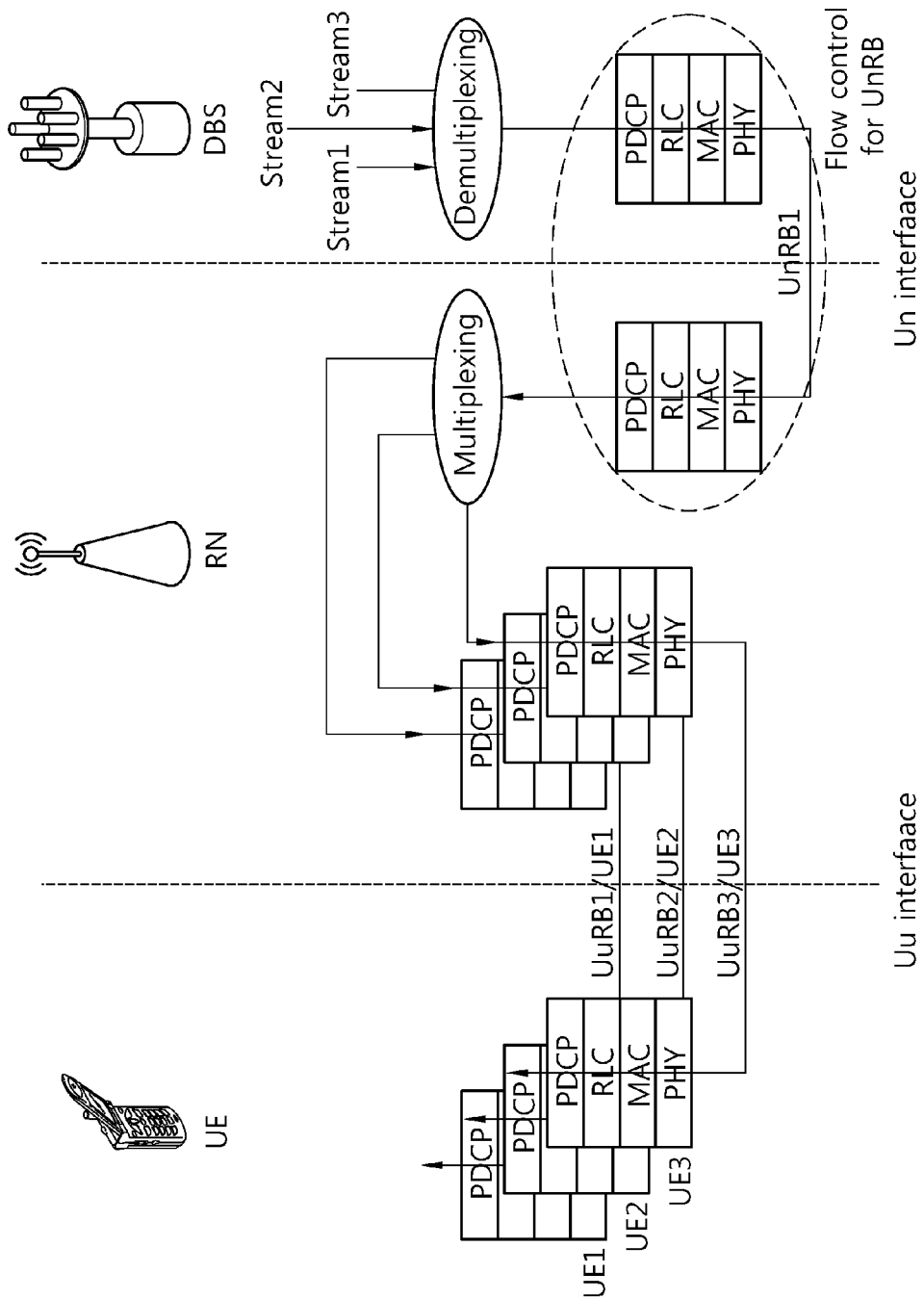
FIG. 8 shows an example of downlink flow control in a wireless communication system employing a relay node (RN).

FIG. 8 shows an example of downlink flow control in a wireless communication system employing an RN.

It is assumed that a UnRB1 is set up between a DBS and the RN, and a UuRB1, a UuRB2, and a UuRB3 are respectively set up between the RN and a UE1, between the RN and a UE2, and between the RN and a UE3. Downlink streams of the DBS are multiplexed and transmitted to the RN through the UnRB1. The RN de-multiplexes the downlink streams and then transmits the downlink streams to the respective UEs.

If the DBS transmits a large amount of data to the RN in a situation where the Uu interface is congested, an overflow may occur in a buffer of the RN, which may cause a data loss. On the contrary, if the DBS transmits a small amount of data to the RN in a situation where the Uu interface is not congested, the buffer of the RN is empty, which may eventually cause waste of radio resources of the Uu interface.

Therefore, the present invention proposes a flow control method in which a receiver controls a data transmission amount of a transmitter by using a wireless interface. In a downlink of a Un interface, the receiver may be an RN, and the transmitter may be a DBS. A control flow to be described hereinafter will be based on a downlink scenario of the Un interface. However, those skilled in the art will easily apply the present invention also to an unlink scenario of the Un interface.

Figure 9:
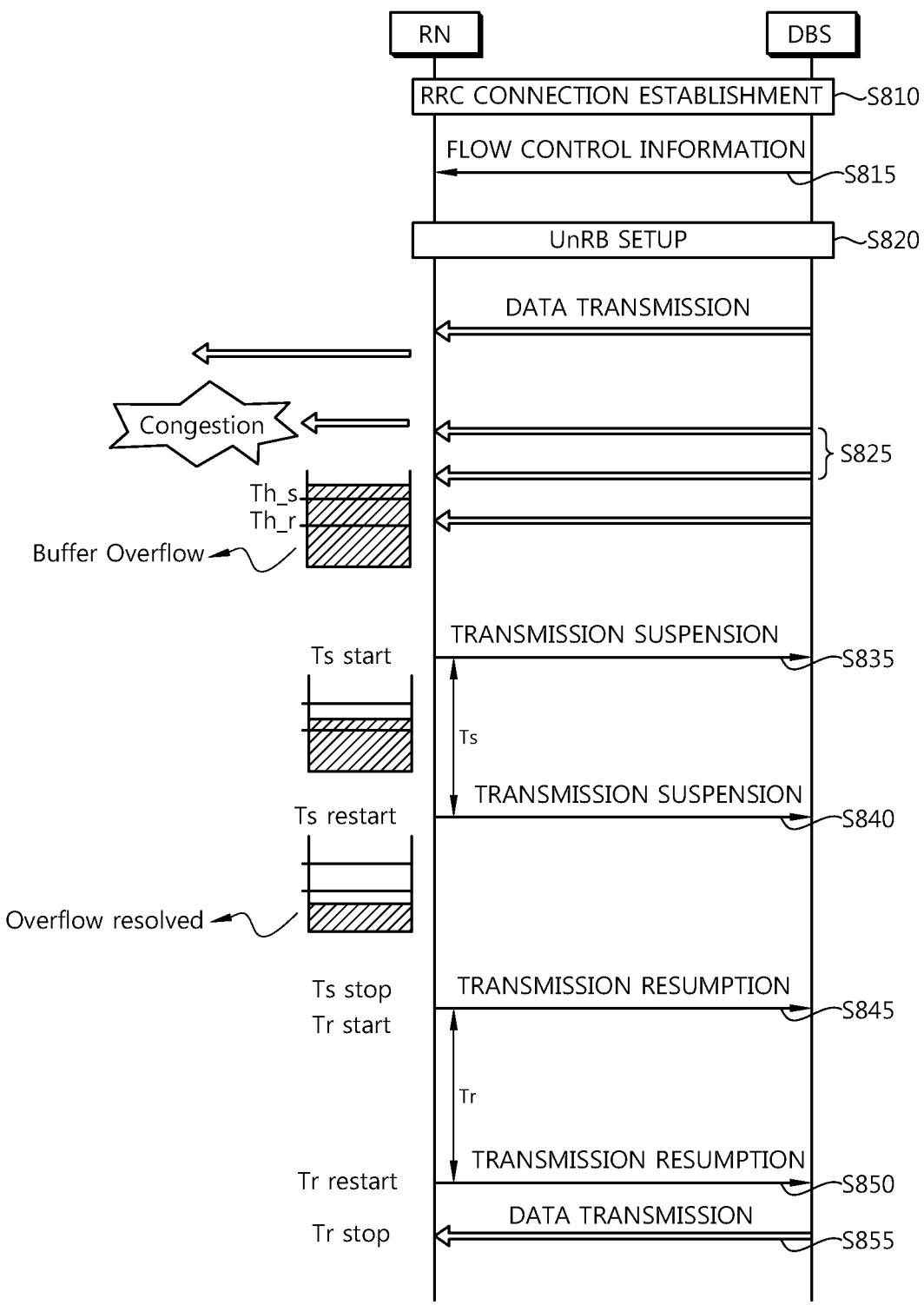
FIG. 9 is a flowchart showing a flow control method according to an embodiment of the present invention.

FIG. 9 is a flowchart showing a flow control method according to an embodiment of the present invention.

An RN establishes an RRC connection by accessing a DBS (step S810).

The RN receives flow control information from the DBS (step S815). The flow control information is information for determining flow control of a Un interface. The flow control information may include information on a suspend threshold Th_s, a resume threshold Th_r, a suspend timer Ts, and/or a resume timer Tr.

The suspend threshold Th_s is a threshold by which the RN determines whether to request the DBS to suspend transmission. The suspend threshold Th_s can be represented by a data amount of a reception buffer for requesting transmission suspension or a remaining data amount of the reception buffer. For example, if the data amount of the current reception buffer is greater than the suspend threshold Th_s, the RN determines that there is a high possibility of a buffer overflow, and requests to suspend transmission.

The resume threshold Th_r is a threshold for determining whether to request to resume transmission after the transmission suspension request. The resume threshold Th_r can be represented by a data amount of a reception buffer for requesting transmission resumption or a remaining data amount of the reception buffer. For example, if the data amount of the current reception buffer is less than the resume threshold Th_r, the RN determines that the buffer overflow is resolved, and requests to resume transmission.

The suspend threshold Th_s and the resume threshold Th_r may be set to the same value. In this case, only one threshold may be used. When the suspend threshold Th_s and the resume threshold Th_r are represented with the data amount of the reception buffer, the suspend threshold Th_s can be set to a greater value than the resume threshold Th_r.

The flow control information may be transmitted by the DBS to the RN by using RRC signaling. If the flow control is applied for all UnRBs of the RN similarly to a MAC layer or a PHY layer, flow control information for all RBs may be transmitted. If the flow control is individually applied for each UnRB similarly to a PDCP layer or an RLC layer, flow control information for each UnRB may be transmitted.

The RN and the DBS set up a UnRB (step S820).

The DBS transmits data streams through the UnRB (step S825).

While the RN receives the data streams from the DBS and relays them to a UE, congestion occurs in a Un interface (step S830).

Due to the congestion of the Uu interface, transmission over the Uu interface is suspended, but reception over the Un interface can be continued.

If an amount of data stored in the reception buffer of the RN is greater than or equal to the suspend threshold Th_s, the RN determines that there is a high possibility of a buffer overflow, and requests the DBS to suspend transmission (step S835). As the transmission suspension is requested, the RN starts the suspend timer Ts.

Upon receiving the transmission suspension request from the RN, the DBS suspends transmission of data streams to the RN until a transmission resume command is received.

If the data amount of the reception buffer is not less than or equal to the resume threshold Th_r until the suspend threshold Th_s expires, the RN retransmits the transmission suspend command to the DBS, and restarts the suspend timer Ts (step S840).

If the data amount of the reception buffer is less than or equal to the resume threshold Th_r while the suspend timer Ts operates, the RN determines that an overflow situation is resolved and transmits a transmission resume message to the DBS so as to resume data stream transmission (step S845). The RN suspends the suspend timer Ts, and restarts the resume timer Tr.

If no data is received from the DBS until the resume timer Tr expires, the RN determines that the previously transmitted transmission resume command is lost during transmission, and retransmits the transmission resume command to the DBS (step S850). Further, the RN resumes the resume timer Tr.

If certain data is received from the DBS while the resume timer Tr operates, the RN suspends the resume timer Tr, and starts normal data reception (step S855).

When an overflow occurs in the reception buffer, the RN transmits a transmission suspend command to the DBS. When the overflow situation is alleviated, the RN transmits a transmission resume command to the DBS. Upon receiving the transmission suspend command, the DBS determines that the overflow situation occurs in the RN, and suspends transmission to the RN. Thereafter, upon receiving the transmission resume command, the DBS resumes transmission to the RN.

The transmission suspend command and the transmission resume command can be indicated by a 1-bit suspend indicator. For example, when the suspend indicator has a value of '1', it may indicate transmission suspension, and when the suspend indicator has a value of '0', it may indicate transmission resumption. The suspend indicator may be delivered through any one layer among a PDCP layer, an RLC layer, a MAC layer, and a PHY layer of a radio protocol. In case of using a second layer, the suspend indicator may be included in a control PDU (e.g., a PDCP control PDU, an RLC control PDU, and a MAC control PDU). In case of using the PHY layer, the suspend indicator may be transmitted through a physical channel (e.g., a physical uplink control channel (PUCCH) and a physical uplink shared channel (PUSCH)).

The PDCP layer or the RLC layer is generated for each UnRB, whereas the MAC layer and the PHY layer are common to all UnRBs of the RN. Therefore, a different method may be applied according to a radio protocol layer in which flow control is performed. For example, if the suspend indicator is transmitted in the PDCP layer or the RLC layer, only a corresponding UnRB is suspended or resumed. When the suspend indicator is transmitted in the MAC layer or the PHY layer, all UnRBs are suspended or resumed. That is, entire data transmission to a corresponding RN is suspended or resumed. When the suspend indicator is transmitted in the PDCP layer or the RLC layer, entire data transmission to the corresponding RN can be allowed to be suspended or resumed.

The suspend threshold Th_s and the resume threshold Th_r are set by considering that the transmission suspend command and/or the transmission resume command can be lost during transmission. If the transmission suspend request is lost, the DBS continues to transmit data to the RN. As a result, a buffer overflow occurs in the RN, and a possibility of discarding the received data increases. If the transmission suspend request is lost, a deadlock may occur in which a receiver waits for reception but a transmitter does not perform transmission.

Therefore, the RN starts a transmission timer when the transmission suspend command is transmitted, and starts a resume timer when the transmission resume command is transmitted. At the expiry of the transmission timer, the RN retransmits the transmission suspend command. At the expiry of the resume timer, the RN retransmits the transmission resume command. A value of the transmission timer and a value of the resume timer may be included in the flow control information.

Figure 10:
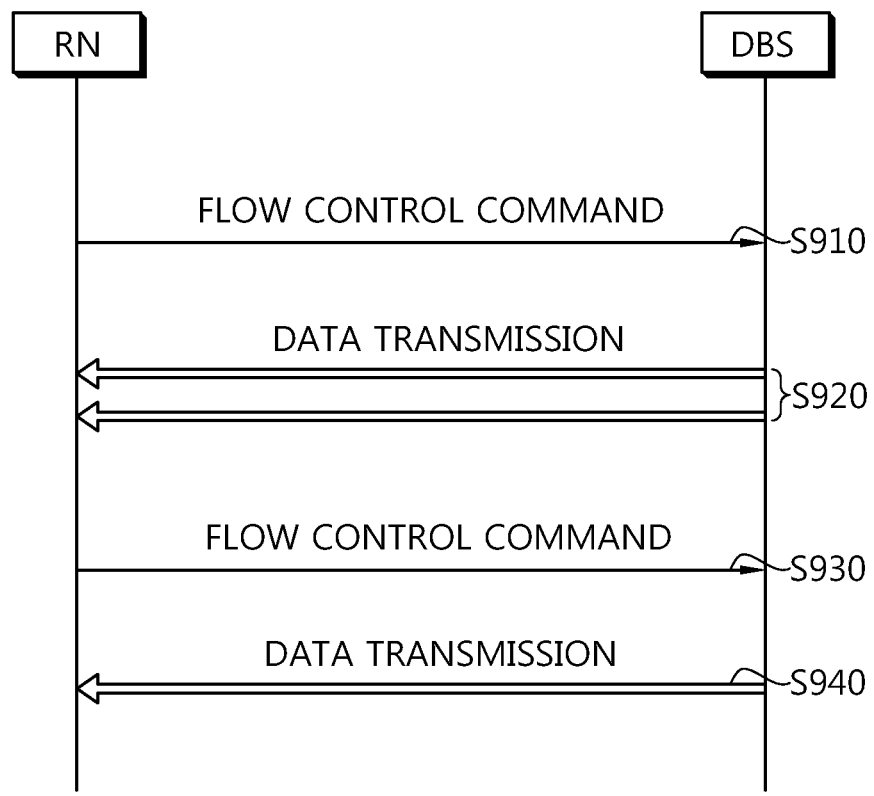
FIG. 10 is a flowchart showing a flow control method according to another embodiment of the present invention.

FIG. 10 is a flowchart showing a flow control method according to another embodiment of the present invention.

An RN transmits a flow control command for flow control to a DBS (step S910). The flow control command may include information on a flow control window and/or a flow control data amount.

The flow control window denotes the number of PDUs that can be transmitted by the DBS to the RN in every designated interval. The designated interval may be a transmission time interval (TTI) or the number of subframes. A size of the flow control window may be variably defined. For example, if the flow control window has an 8-bit field, the RN can regulate the number of PDUs, which can be transmitted by the DBS during one TTI, in the range of 0 to 255.

The flow control data amount denotes a data amount that can be transmitted by the DBS to the RN in every designated interval. Since a PDU size may differ for each PDU, the flow control is performed by using full data amount. A size of the flow control data amount may be variously defined. For example, if the flow control data amount is an 8-bit field and a bit rate represented by one bit is 1 kilobyte (Kbyte), the RN can regulate a size of data, which can be transmitted by the DBS during one TTI, in the range of 0 to 255 Kbytes.

The flow control command can be used in any layers among a PDCP layer, an RLC layer, a MAC layer, and a PHY layer. If it is used in a second layer, the flow control command may be included in a control PDU (i.e., a PDCP control PDU, an RLC control PDU, and a MAC control PDU). If it is used in the PHY layer, the flow control command may be transmitted over a physical channel (e.g., a PUCCH and a PUSCH).

The DBS transmits scheduled data to the RN according to flow control on the basis of the flow control command (step S920).

The RN may transmit an update flow control command to the DBS (step S930). The DBS transmits data to the RN on the based of the updated flow control command (step S940).

The RN can update the flow control command according to a data amount of a reception buffer. If the data amount of the reception buffer is great, the number of PDUs to be transmitted is decreased by decreasing a size of a flow control window. If the data amount of the reception buffer is small, the number of PDUs to be transmitted is increased by increasing the size of the flow control window. Alternatively, if the data amount of the reception buffer is great, an amount of data to be transmitted is decreased by decreasing a size of a flow control data amount, and if the data amount of the reception buffer is small, the amount of data to be transmitted is increased by increasing the size of the flow control data amount.

To prevent the flow control command from being transmitted too frequently, the flow control command may be transmitted only when the data amount of the reception buffer is greater than or equal to a control threshold. For example, if the data amount of the reception buffer is greater than or equal to the control threshold, the data amount or the number of PDUs transmitted using the flow control command is decreased. If the data amount of the reception buffer is less than or equal to the control threshold, the data amount or the number of PDUs is increased by using the flow control command. The control threshold may be determined by the DBS and then be reported to the RN when the RN first accesses the DBS or when a UnRB is set up.

To prevent the flow control command from being transmitted too frequently, a control timer may be used. The RN starts the control timer after transmitting the flow control command. At the expiry of the control timer, the flow control command is retransmitted according to a buffer status. The control timer may be determined by the DBS and then be reported to the RN when the RN first accesses the DBS or when a UnRB is set up.

The control threshold and the control timer may be used in combination. At the expiry of the control timer, the flow control command is transmitted when the data amount of the reception buffer is greater than or equal to the control threshold.

To prevent the flow control command from being lost during transmission, a confirmation timer may be used. The RN starts the confirmation timer after transmitting the flow control command. It is determined whether the data amount of the number of PDUs received from the DBS while the confirmation timer operates is different from the determined flow control command. If it is different from the determined flow control command, the RN retransmits the flow control command at the expiry of the confirmation timer, and resumes the confirmation timer. The confirmation timer may be determined by the DBS and then be reported to the RN when the RN first accesses the DBS or when a UnRB is set up.

Figure 11:
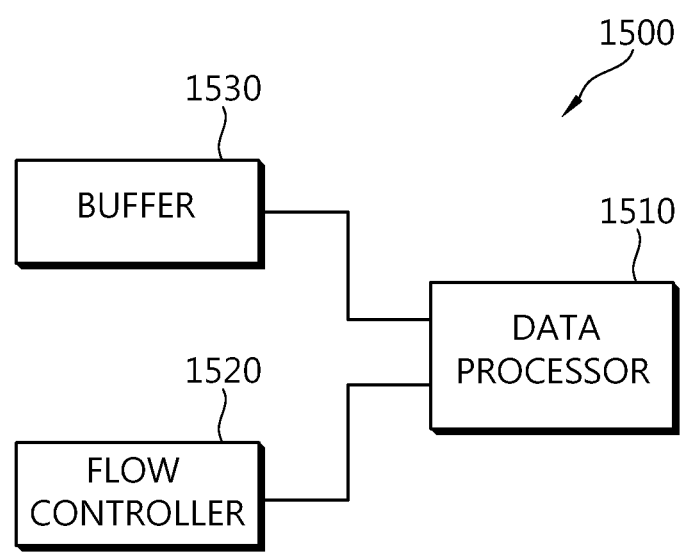
FIG. 11 is a block diagram showing an RN for implementing an embodiment of the present invention.

FIG. 11 is a block diagram showing a relay node to implement an embodiment of the present invention.

A RN 1500 includes a data processor 1510, a flow controller 1520 and a buffer 1530. The data processor 1510 configures UnRB and/or UuRB. The data processor 1510 processes received data and relays the processed data. The buffer 1530 stores the received data.

The flow controller 1520 implements a flow control for a Un interface. The flow controller 1520 determines transmission suspension and/or transmission resumption based on flow control information. The flow controller 1520 sends the transmission suspend command and/or the transmission resume command to a DBS. The flow controller 1520 may send the flow control command to the DBS The data processor 1510 and the flow controller 1520 may be implemented with a processor. The processor may be configured to implement layers of the radio interface protocol and implement the operation of the RN in the embodiments of FIGS. 9 and 10.

The processor may include application-specific integrated circuit (ASIC), other chipset, logic circuit and/or data processing device. When the embodiments are implemented in software, the techniques described herein can be implemented with modules (e.g., procedures, functions, and so on) that perform the functions described herein. The modules can be executed by the processor.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for flow control of a relay node in a wireless communication system, the method comprising:
receiving, by the relay node from a base station, flow control information for a Un interface between the relay node and the base station, the flow control information comprising a suspend threshold and a resume threshold;
determining whether to request to suspend or resume transmission based on the flow control information;
transmitting a transmission suspend command to the base station if a data amount of a reception buffer is greater than the suspend threshold, the transmission suspend command requesting to suspend the transmission; and
starting a suspend timer as the transmission suspend command is transmitted,
wherein if the data amount of the reception buffer exceeds the suspend threshold when the suspend timer expires,
retransmitting the transmission suspend command to the base station at the expiry of the suspend timer; and
restarting the suspend timer,
wherein if the data amount of the reception buffer is equal to or less than the resume threshold, transmitting a transmission resume command to the base station, stopping the suspend timer, and starting a resume timer, the transmission resume command requesting to resume the transmission, and
wherein if no data is received by the relay node from the base station until the resume timer expires, retransmitting the transmission resume command to the base station, and restarting the resume timer.

2. The method of claim 1, wherein the flow control information is determined for each radio bearer (RB) configured between the base station and the relay node.

3. The method of claim 1, wherein the flow control information is determined for entire RB configured between the base station and the relay node.

4. The method of claim 1, wherein the suspend timer is used for avoiding an transmission overflow, and
wherein the resume timer is used for avoiding an occurrence of deadlock between the relay node and the base station.

5. A relay node in a wireless communication system, the relay node comprising:
a buffer configured to store reception data received from a base station; and
a flow controller configured to:
receive flow control information for a Un interface between the relay node and the base station from the base station, the flow control information comprising a suspend threshold and a resume threshold;
determine whether to request to suspend or resume transmission based on flow control information,
transmit a transmission suspend command to the base station if a data amount of the buffer is greater than the suspend threshold, the transmission suspend command requesting to suspend the transmission; and
start a suspend timer as the transmission suspend command is transmitted,
wherein if the data amount of the buffer exceeds than the suspend threshold when the suspend timer expires,
retransmit the transmission suspend command to the base station at the expiry of the suspend timer; and
restart the suspend timer,
wherein if the data amount of the buffer is equal to or less than the resume threshold, transmit a transmission resume command to the base station, stop the suspend timer, and start a resume timer, the transmission resume command requesting to resume the transmission, and
wherein if no data is received by the relay node from the base station until the resume timer expires, retransmit the transmission resume command to the base station and restart the resume timer.

* * * * *